(12) United States Patent
Katsumata et al.

(10) Patent No.: US 10,369,983 B2
(45) Date of Patent: Aug. 6, 2019

(54) CONTROL APPARATUS FOR HYBRID VEHICLE

(71) Applicants: Toyota Jidosha Kabushiki Kaisha, Toyota-shi (JP); Aisin AW Co., Ltd., Anjo-shi (JP)

(72) Inventors: Munehiro Katsumata, Toyota (JP); Hiromichi Kimura, Okazaki (JP); Kazuyuki Shiiba, Miyoshi (JP); Tooru Matsubara, Toyota (JP); Takeshi Kitahata, Miyoshi (JP); Kenta Kumazaki, Anjo (JP); Nobufusa Kobayashi, Anjo (JP); Masato Yoshikawa, Toyota (JP); Takahiro Kimura, Tajimi (JP); Daisuke Suyama, Anjo (JP); Kazuomi Okasaka, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 31 days.

(21) Appl. No.: 15/846,888

(22) Filed: Dec. 19, 2017

(65) Prior Publication Data
US 2018/0170346 A1 Jun. 21, 2018

(30) Foreign Application Priority Data
Dec. 19, 2016 (JP) .................................. 2016-245976

(51) Int. Cl.
*B60W 20/10* (2016.01)
*B60W 10/06* (2006.01)
(Continued)

(52) U.S. Cl.
CPC ............. *B60W 20/10* (2013.01); *B60K 6/365* (2013.01); *B60K 6/445* (2013.01); *B60W 10/06* (2013.01);
(Continued)

(58) Field of Classification Search
None
See application file for complete search history.

(56) References Cited

U.S. PATENT DOCUMENTS 5,873,426 A * 2/1999 Tabata .................. B60K 6/365
180/65.7
5,982,045 A * 11/1999 Tabata ..................... B60K 6/48
290/17

(Continued)

FOREIGN PATENT DOCUMENTS

JP 2014-223888 12/2014

*Primary Examiner* — Colby M Hansen
(74) *Attorney, Agent, or Firm* — Oblon, McClelland, Maier & Neustadt, L.L.P.

(57) ABSTRACT

A control apparatus for a hybrid vehicle provided with an engine, a differential mechanism having a first rotary element to which the engine is operatively connected, a second rotary element to which a first motor/generator is operatively connected, and a third rotary element to which an intermediate power transmitting member is connected, a second motor/generator operatively connected to the intermediate power transmitting member, and an automatic transmission which constitutes a part of a power transmitting path between the intermediate power transmitting member and drive wheels and in which a shifting action is performed by selective engagement of a plurality of coupling devices, the control apparatus comprising: a hybrid control portion for controlling an output torque of the first motor/generator and an output torque of the second motor/generator during the shifting action of the automatic transmission on the basis of an output torque of the engine and a transmitted torque of the
(Continued)

coupling devices, such that an angular acceleration value of the second motor/generator and an angular acceleration value of the engine coincide with respective target values; a limited state determining portion for determining whether the output torque of the first motor/generator is in a limited state of being limited lower than a predetermined load capable of ensuring a shift-progressing torque necessary for progress of a power-on shift-down action of the automatic transmission; and an output limiting portion for limiting the output torque of the engine to a predetermined torque or less if the output torque of the first motor/generator is in the limited state during the power-on shift-down action of the automatic transmission.

17 Claims, 9 Drawing Sheets

(51) Int. Cl.
*B60W 10/08* (2006.01)
*B60W 10/10* (2012.01)
*B60K 6/365* (2007.10)
*B60K 6/445* (2007.10)
*B60W 50/08* (2012.01)

(52) U.S. Cl.
CPC ............ *B60W 10/08* (2013.01); *B60W 10/10* (2013.01); *B60W 50/082* (2013.01); *B60W 2510/0652* (2013.01); *B60W 2510/0657* (2013.01); *B60W 2510/082* (2013.01); *B60W 2510/083* (2013.01); *B60W 2510/1005* (2013.01); *B60W 2520/10* (2013.01); *B60W 2710/0661* (2013.01); *B60W 2710/0666* (2013.01); *B60W 2710/082* (2013.01); *B60W 2710/083* (2013.01); *B60Y 2200/92* (2013.01); *Y02T 10/6239* (2013.01); *Y02T 10/6286* (2013.01); *Y02T 10/7077* (2013.01); *Y02T 10/7275* (2013.01); *Y10S 903/911* (2013.01); *Y10S 903/93* (2013.01)

(56) References Cited

U.S. PATENT DOCUMENTS

| | | | | |
|---|---|---|---|---|
| 6,409,626 | B1 * | 6/2002 | Irwin | B60K 17/16 384/583 |
| 6,600,980 | B1 * | 7/2003 | Kraska | B60K 6/445 477/2 |
| 2008/0153661 | A1 * | 6/2008 | Shibata | B60K 6/445 477/3 |
| 2008/0153664 | A1 * | 6/2008 | Tabata | B60K 6/365 477/37 |
| 2014/0343775 | A1 | 11/2014 | Yamamoto et al. | |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

CONTROL APPARATUS FOR HYBRID VEHICLE

This application claims priority from Japanese Patent Application No. 2016-245976 filed on Dec. 19, 2016, the disclosure of which is herein incorporated by reference in its entirety.

TECHNICAL FIELD

The present invention relates to a control apparatus for a hybrid vehicle provided with a differential mechanism and an automatic transmission in series.

BACKGROUND ART

For a hybrid vehicle provided with an engine, a differential mechanism having three rotary elements to which the engine, a first motor/generator, and an intermediate power transmitting member are respectively connected, a second motor/generator operatively connected to the intermediate power transmitting member, and an automatic transmission which constitutes a part of a power transmitting path between the intermediate power transmitting member and drive wheels and in which a shifting action is performed by selective engagement of a plurality of coupling devices, a control apparatus is well known. For example, this corresponds to a hybrid vehicle described in JP-2014-223888A. It is disclosed in JP-2014-223888A that a torque of the first motor/generator and a torque of the second motor/generator are controlled during the shifting action of the automatic transmission on the basis of a torque of the engine and a torque capacity of the automatic transmission, such that an angular acceleration value of the second motor/generator and an angular acceleration value of the engine coincide with respective target values.

While an output torque of the first motor/generator is limited during a power-on shift-down action of the automatic transmission, the first motor/generator may not be able to generate a torque for lowering an operating speed thereof during the shifting (i.e., the torque necessary for progress of the shifting action) in addition to a reaction torque receiving an output torque of the engine. In such a case, the progress of the shifting action may stagnate, or an operating speed of the engine may race up (temporarily increase) higher than, for example, a post-shifting synchronizing speed, as a rotating speed of the intermediate power transmitting member increases due to the shift-down action of the automatic transmission, possibly giving a strange feeling to a driver.

SUMMARY OF THE INVENTION

The present invention was conceived in view of the situations and it is therefore an object of the present invention to provide a control apparatus for a hybrid vehicle capable of preventing or suppressing a strange feeling given to a driver due to stagnation of progress of a shifting action of an automatic transmission or racing of an operating speed of an engine at the time of a power-on shift-down action of the automatic transmission.

The object indicated above is achieved according to the following modes of the present invention:

According to a first mode of the invention, there is provided a control apparatus for a hybrid vehicle provided with an engine, a differential mechanism having a first rotary element to which the engine is operatively connected, a second rotary element to which a first motor/generator is operatively connected, and a third rotary element to which an intermediate power transmitting member is connected, a second motor/generator operatively connected to the intermediate power transmitting member, and an automatic transmission which constitutes a part of a power transmitting path between the intermediate power transmitting member and drive wheels and in which a shifting action is performed by selective engagement of a plurality of coupling devices, the control apparatus comprising: a hybrid control portion controlling an output torque of the first motor/generator and an output torque of the second motor/generator during the shifting action of the automatic transmission on the basis of an output torque of the engine and a transmitted torque of the coupling devices, such that an angular acceleration value of the second motor/generator and an angular acceleration value of the engine coincide with respective target values; a limited state determining portion determining whether the output torque of the first motor/generator is in a limited state of being limited lower than a predetermined load ensuring a shift-progressing torque necessary for progress of a power-on shift-down action of the automatic transmission; and an output limiting portion limiting the output torque of the engine to a predetermined torque or less if the output torque of the first motor/generator is in the limited state during the power-on shift-down action of the automatic transmission.

According to a second mode of the invention, the control apparatus according to the first mode of the invention is configured such that the limited state determining portion sets the predetermined load based on at least one of a kind of a shifting action of the automatic transmission, a vehicle running speed, and a change amount of an operating speed of the engine during the power-on shift-down action of the automatic transmission.

According to a third mode of the invention, the control apparatus according to the first or second mode of the invention is configured such that the predetermined torque is an upper limit output torque of the engine enabling the output torque of the first motor/generator to achieve a torque acquired by adding the shift-progressing torque to a reaction torque receiving the output torque of the engine, and the output limiting portion sets the predetermined torque based on at least one of a limit value of the output torque of the first motor/generator, a kind of a shifting action of the automatic transmission, a vehicle running speed, and a change amount of an operating speed of the engine during the power-on shift-down action of the automatic transmission.

According to a fourth mode of the invention, the control apparatus according to any one of the first through third modes of the invention is configured such that the output limiting portion initiates limitation of the output torque of the engine when the output torque of the engine is stably output.

According to a fifth mode of the invention, the control apparatus according to any one of the first through fourth modes of the invention is configured such that the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

According to a sixth mode of the invention, the control apparatus according to any one of the first through fifth modes of the invention is configured such that if a shift-down action is allowed to progress as a power-off shift-down action due to switching to a power-off state during limitation of the output torque of the engine, the output limiting portion cancels the limitation of the output torque of the engine.

According to the first mode of the invention, when the output torque of the first motor/generator is in the limited state during the power-on shift-down action of the automatic transmission, the output torque of the engine is limited to the predetermined torque or less, the reaction torque of the first motor/generator receiving the output torque of the engine is reduced. This enables the first motor/generator to ensure the torque for lowering the operating speed thereof for performing the shifting action (i.e., the shift-progressing torque necessary for the progress of the power-on shift-down action), so that the power-on shift-down can be performed while preventing or suppressing the stagnation of progress of the shifting action or the racing of the operating speed of the engine. Therefore, at the time of the power-on shift-down action of the automatic transmission, a driver can be prevented or restrained from having a strange feeling due to stagnation of progress of the shifting action or the racing of the operating speed of the engine.

According to the second mode of the invention, since the predetermined load is set based on at least one of the kind of the shifting action of the automatic transmission, the vehicle running speed, and the change amount of the operating speed of the engine during the power-on shift-down action of the automatic transmission, it is appropriately determined whether the output torque of the first motor/generator is in the limited state.

According to the third mode of the invention, since the predetermined torque is set based on at least one of the limit value of the output torque of the first motor/generator, the kind of the shifting action of the automatic transmission, the vehicle running speed, and the change amount of the operating speed of the engine during the power-on shift-down action of the automatic transmission, the power-on shift-down action can appropriately be performed while preventing or suppressing the stagnation of progress of the shifting action or the racing of the operating speed of the engine. The predetermined torque is the upper limit output torque of the engine enabling the output torque of the first motor/generator to achieve a torque acquired by adding the shift-progressing torque to the reaction torque receiving the output torque of the engine.

According to the fourth mode of the invention, the limitation of the output torque of the engine is initiated while the torque of the engine is stably output, so that an operation of the engine hardly becomes unstable even if the output torque of the engine is limited.

According to the fifth mode of the invention, the limitation of the output torque of the engine is terminated when the power-on shift-down action of the automatic transmission is completed, or when the progress degree of the power-on shift-down action has reached the predetermined progress degree, or when the predetermined length of time has elapsed from the start of the control of the power-on shift-down action, or when the predetermined length time has elapsed from the start of change in the rotating speed of the input rotary member of the automatic transmission due to the power-on shift-down action, so that the output torque of the engine is appropriately limited while the possibility of stagnation of progress of the shifting action or racing of the operating speed of the engine exists. From another viewpoint, if the possibility of stagnation of progress of the shifting action or racing of the operating speed of the engine becomes lower, the torque of the engine is more easily output as requested.

According to the sixth mode of the invention, if a shift-down action is allowed to progress as a power-off shift-down action due to switching to the power-off state during the limitation of the output torque of the engine, the limitation of the output torque of the engine is canceled, so that the control suitable for the power-off shift-down action is properly provided.

DETAILED DESCRIPTION OF PREFERRED EMBODIMENTS

Figure 1:
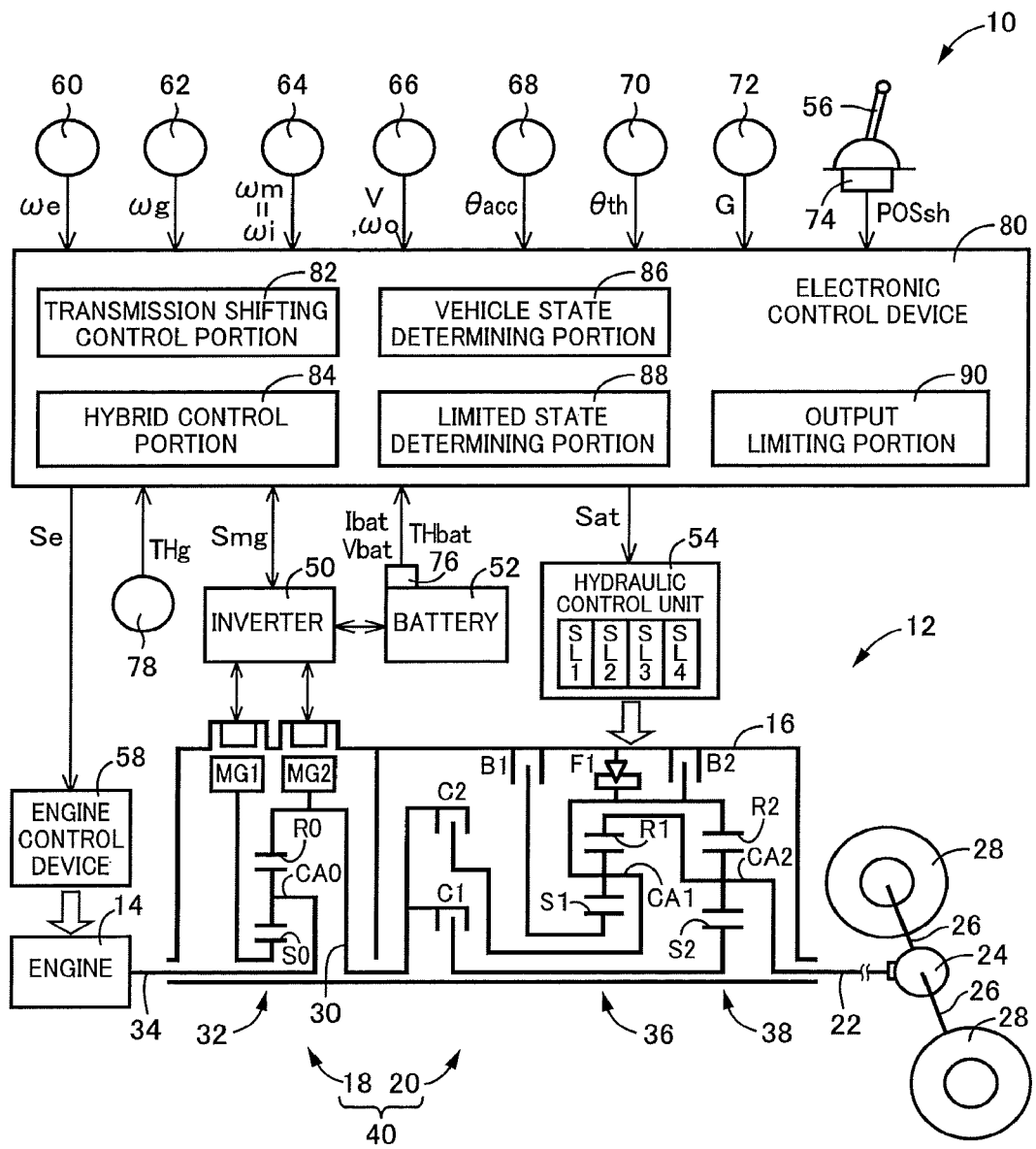
FIG. 1 is a schematic view showing an arrangement of a drive system of a vehicle to be controlled by a control apparatus according to the present invention, and major control functions and control portions of the control apparatus.

In the following embodiments of the invention, rotating speeds ω of rotary members such as the above-described engine, first motor/generator, second motor/generator, rotary elements of the differential mechanism, intermediate power transmitting member and rotary elements of the automatic transmission correspond to angular velocities of the rotary members, and angular acceleration values dω/dt of the rotary members are rates of change of the rotating speeds ω, namely, time derivative values of the rotating speeds ω. In the mathematical equation (1) given below, the angular acceleration values dω/dt are represented by co with a dot superposed thereon.

Referring to the drawings, preferred embodiments of the present invention will be described in detail.

EMBODIMENTS

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20) connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power transmitting member 30 such that the intermediate power transmitting member 30 is rotated together with the second motor/generator MG2, or since the engine 14 is connected to an input rotary member of the continuously variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. Therefore, the engaging torque Tcb and the CB-transmitted torque are equal to each other in the process of the engaging action of the coupling device CB with a speed difference between its input and output elements. In the present embodiment, the CB-transmitted torque in the process of a shifting action of the step-variable transmission portion 20 with a speed difference of the input and output elements (for example, the CB-transmitted torque during an inertia phase of the shifting action) is represented by the engaging torque Tcb (namely, CB-transmitted torque Tcb). It is noted that the engaging torque (CB-transmitted torque) Tcb and the engaging hydraulic pressure PRcb are proportional to each other, before the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second motor/generator MG2. Thus, the AT input speed ωi can be represented by the MG2 speed ωm. The AT output speed ω is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
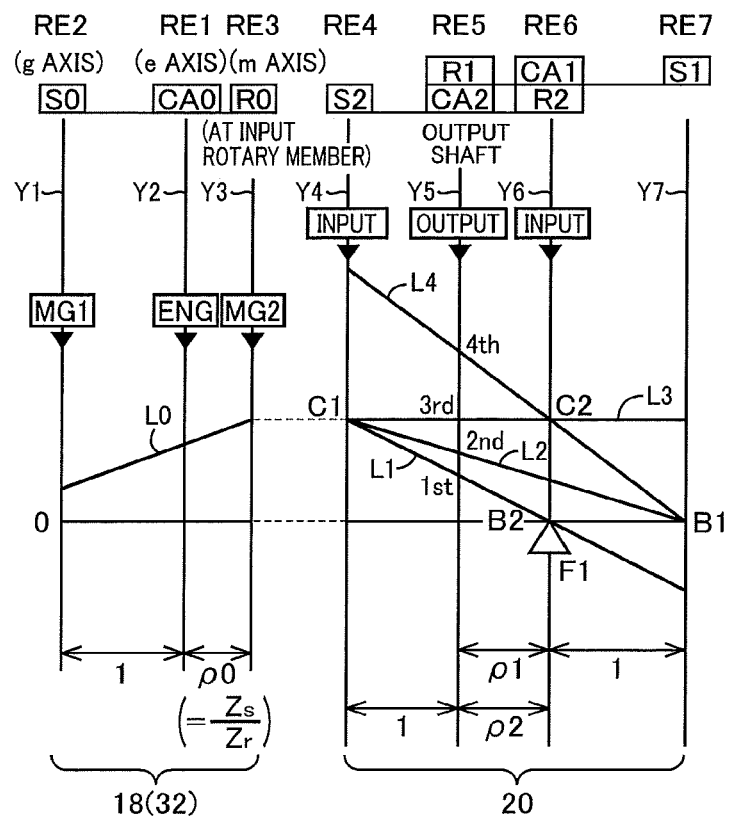
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "1st", "2nd", "3rd" and "4th". The first speed AT gear position "1st" has a highest speed ratio γat, and the speed ratios γat of the four AT gear positions decrease in the direction from the first speed AT gear position (lowest-speed gear position) "1st" toward the fourth speed AT gear position (highest-speed gear position) "4th". In the table, "0" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "1st", so that the brake B2 is not required to be placed in the engaged state upon starting or acceleration of the vehicle 10. The above-indicated shift-down action of the step-variable transmission portion 20 in the coasting run of the vehicle 10 is kind of a "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB was placed in the engaged state before the step-variable transmission portion 20 is shifted to establish the newly selected AT gear position, while the above-indicated another coupling device CB is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "2nd" to the first speed AT gear position "1st", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates the relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the faint of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "1st", "2nd", "3rd" and "4th" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td (=Te/(1+ρ) =−(1/ρ)*Tg) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. When the vehicle 10 is driven in the rearward direction, in the motor drive mode, for example, the MG2 torque Tm which is a negative torque is applied to the ring gear R0 and rotating the ring gear R0 in the negative direction, and is transmitted as rear drive torque of the vehicle 10 to the drive wheels 28 through the step-variable transmission portion 20 placed in the first speed AT gear position.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, to which the second motor/generator MG2 is operatively connected) in a power transmittable manner. Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio γ0 (=ωe/ωm) of which is variable. The speed ratio is a ratio of a rotating speed of the connecting shaft 34 (namely, engine speed ωe) to the rotating speed of the intermediate power transmitting member 30 (namely, MG2 speed ωm).

In the hybrid drive mode, for instance, the rotating speed of the sun gear S0 is raised or lowered by controlling an operating speed of the first motor/generator MG1 while the rotating speed of the ring gear R0 is determined by a rotating speed of the drive wheels 28 with the step-variable transmission portion 20 placed in one of the AT gear positions, so that the rotating speed of the carrier CA0 (namely, engine speed ωe) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio γt (=ωe/ω) which is a ratio of the engine speed ωe to the output speed ω. The speed ratio γt is an overall speed ratio of the transmission device 40 consisting of the continuously variable transmission portion 18 and the step-variable transmission portion 20 which are disposed in series with each other. The overall speed ratio γt is equal to a product of the speed ratio γ0 of the continuously variable transmission portion 18 and the speed ratio γat of the step-variable transmission portion 20, namely, γt=γ0*γat.

Figures 4, 5:
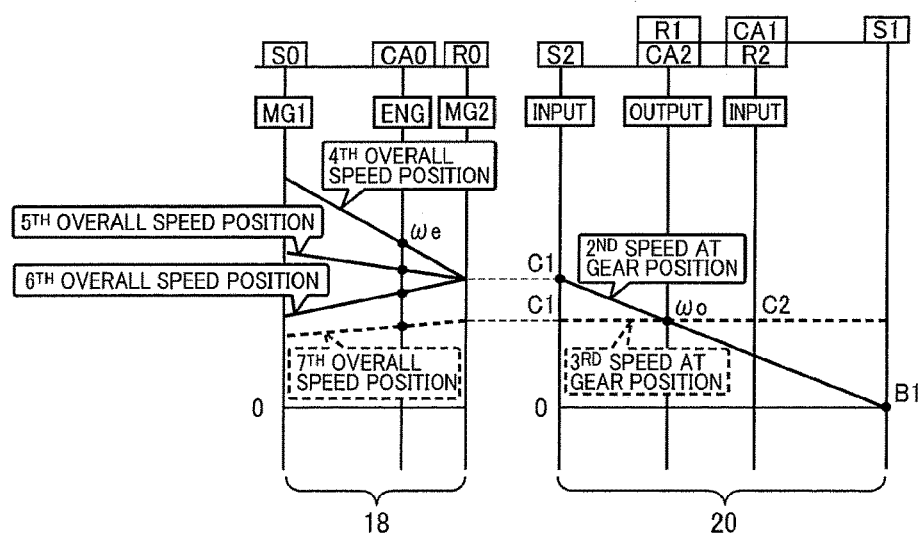
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values γ0 of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed ωe with respect to the output speed ωo for establishing the predetermined overall speed ratio values γt, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 is supplied with various input signals such as: the engine speed ωe, an MG1 speed cog that is the operating speed of the first motor/generator MG1, an MG2 speed corn that is the AT input speed ωi, the output speed coo corresponding to the vehicle running speed V, the operation amount θacc of the accelerator pedal, which operation amount θacc represents a degree of acceleration of the vehicle 10 required by a vehicle operator, an angle θth of opening of an electronic throttle valve, a longitudinal acceleration value G of the vehicle 10, an operating position POSsh of a shift lever 56 serving as a manually operated shifting member provided in the vehicle 10, a temperature THbat, a charging/discharging electric current Ibat, and a voltage Vbat of the battery 52, an MG1 temperature THg that is a temperature of the first motor/generator MG1, based on detection values from various sensors etc. disposed on the vehicle 10 such as: an engine speed sensor 60, an MG1 speed sensor 62, an MG2 speed sensor 64, an output speed sensor 66, an accelerator pedal operation amount sensor 68, a throttle valve opening angle sensor 70, an acceleration sensor 72, a shift position sensor 74, a battery sensor 76, and an MG1 temperature sensor 78. Further, the electronic control device 80 generates various output signals such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the temperature THbat when the temperature THbat is lower than a nothial level, and decrease with an increase of the temperature THbat when the temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator pedal operation amount θacc are taken along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of an engine power Pe which is a power of the engine 14 outputting the torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 speed ωm.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission portion 18 is controlled so as to be continuously varied. As a result, the speed ratio γt of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed ωe according to the output speed ωo so as to maintain the respective speed ratio values γt. It is noted that the speed ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
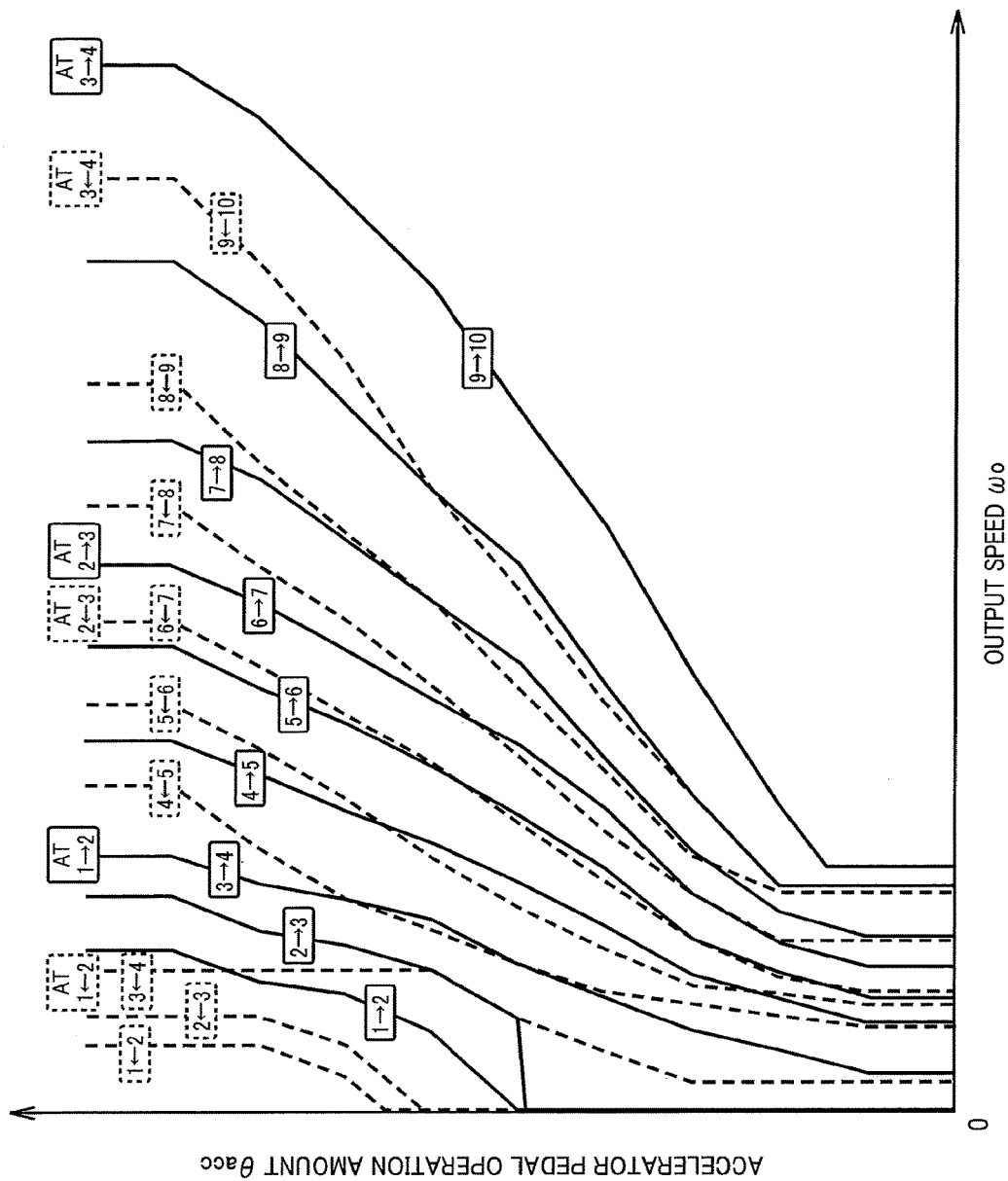
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

Figure 7:
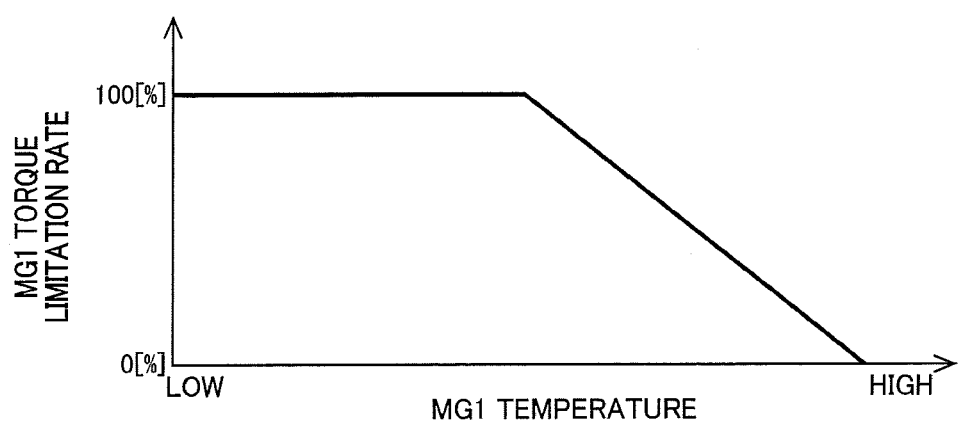
FIG. 7 is a view illustrating an example in which an MG1 torque that is an output torque of a first motor/generator is limited based on an MG1 temperature that is a temperature of the first motor/generator.

The hybrid control portion 84 limits the MG1 torque Tg based on the MG1 temperature THg. FIG. 7 is a diagram of an example in which the MG1 torque Tg is limited based on the MG1 temperature THg. In FIG. 7, in a region of the high MG1 temperature THg, the first motor/generator MG1 has a limitation rate Rres of the MG1 torque Tg (also referred to as an MG1 torque limitation rate Rres) gradually reduced from the maximum rate of 100 [%] when the MG1 temperature THg is higher. Therefore, an upper limit value of the MG1 torque Tg allowed to be output is made smaller when the MG1 temperature THg becomes greater in the region of the high MG1 temperature THg. Limiting the load of the first motor/generator MG1 in the region of the high MG1 temperature THg suppresses further overheating of the first motor/generator MG1 and an irreversible output reduction due to demagnetization caused by overheating. The limitation rate Rres is a numerical value indicative of how much load on the first motor/generator MG1 is allowed when the rating is 100 [%], for example, and corresponds to an allowable load factor.

Detailed description will be made of the overall step-variable shifting control of the transmission device 40 when accompanied by a shifting action of the step-variable transmission portion 20. During a shifting action of the step-variable transmission portion 20 by the transmission shifting control portion 82 (more specifically, in the process of engaging and releasing actions of the relevant two coupling devices CB in an inertial phase of the shifting action), the hybrid control portion 84 provides a shifting-time basic control in which the MG1 torque Tg and the MG2 torque Tm are controlled based on the engine torque Te and the CB-transmitted torque Tcb of one of the two coupling devices CB to be respectively brought into its engaged and released states to permit the step-variable transmission portion 20 to perform the shifting action, wherein the one of the two coupling devices CB is an initiative coupling device, which causes the shifting action to progress, and CB-transmitted torque Tcb of which is controlled to progressively implement the shifting action, and, such that an MG2 angular acceleration value dωm/dt defined as the angular acceleration value of the second motor/generator MG2 and an engine angular acceleration value doe/dt defined as the angular acceleration value of the engine 14 coincide with respective target values. By controlling the MG1 torque Tg and the MG2 torque Tm, the input torque Ti of the step-variable transmission portion 20 can be controlled since a sum of the MG2 torque and the directly transmitted engine torque Td applied to the ring gear R0 due to the reaction torque by the MG1 torque Tg that acts against the engine torque Te is equal to the input torque Ti of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on (a state where the accelerator pedal is depressed) shifting modes are implemented when the accelerator pedal operation amount θacc is increased or when the vehicle running speed V is raised while the accelerator pedal is kept in an operated position, and the shifting controls in the power-off (a state where the accelerator pedal is depressed) shifting modes are implemented when the accelerator pedal operation amount θacc is reduced or when the vehicle running speed V is lowered while the accelerator pedal is kept in its non-operated or fully released position. If none of the two coupling devices to be respectively brought into the released and engaged states is given the CB-transmitted torque Tcb, the AT input speed ωi is naturally raised to a predetermined optimum value in the power-on shifting modes, and is naturally lowered to a predetermined optimum value in the power-off shifting modes. Accordingly, the shifting action is preferably initiated by increasing the CB-transmitted torque Tcb of the coupling device CB which is to be brought into the engaged state for the shifting action, in the power-on shift-up and power-off shift-down modes in which the AT input speed ωi is not naturally changed to a predetermined synchronizing speed ωisyca (=ω *speed ratio γata to be established after completion of the shifting action) if none of the two coupling devices to be respectively brought into the released and engaged states is given the CB-transmitted torque Tcb. On the other hand, the shifting action is preferably initiated by reducing the CB-transmitted torque Tcb of the coupling device CB which has been placed in the engaged state before the shifting action and which is to be brought into the released state for the shifting action, in the power-off shift-up and power-on shift-down modes in which the AT input speed ωi is naturally changed to the predetermined synchronizing speed ωisyca even if none of the two coupling devices to be respectively brought into the released and engaged states is given the CB-transmitted torque Tcb. Thus, the coupling device CB to be brought into the engaged state in the power-on shift-up and power-off shift-down modes is the initiative coupling device the CB-transmitted torque Tcb of which is controlled to progressively implement the shifting action, while the coupling device CB to be brought into the released state in the power-off shift-up and power-on shift-down modes is the initiative coupling device the CB-transmitted torque Tcb of which is controlled to progressively implement the shifting action.

Described more specifically, the hybrid control portion 84 is configured to calculate the MG1 torque Tg and the MG2 torque Tm according to the following mathematical equation (1), and on the basis of the target values of the MG2 angular acceleration value dωm/dt and the engine angular acceleration value dωe/dt, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g", "e" and "m" axes of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, ..., b11, ..., c22 in 2*2 matrices in the mathematical equation (1) represent combinations of parameters such as the inertia values of the rotary members of the continuously variable transmission portion 18, and the gear ratio γ0 of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

For example, the target values of the MG2 angular acceleration value dωm/dt and the engine angular acceleration value dωe/dt in the mathematical equation (1) indicated above are predetermined, and depending upon the presently established one of the shifting modes of the step-variable transmission portion 20, the specific shifting action of the step-variable transmission portion 20 to be perforated between the AT gear positions, and the specific shifting action of the transmission device 40 to be performed between the overall speed positions, namely, depending upon which one of the shifting modes (such as the above-described power-on shift-up mode, power-off shift-up mode, power-on shift-down mode and power-off shift-down mode) is to be performed in the step-variable transmission portion 20, between which AT speed positions the shifting action is to be performed in the step-variable transmission portion 20, and between which overall speed positions the shifting action is to be perforated in the transmission device 40. The engine torque Te in the mathematical equation (1) is a required engine torque Tedem at the engine speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m" axis) which are obtained by conversion from the CB-transmitted torques Tcb transmitted through the respective two coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is an equation for a theoretical model of the shifting action of the step-variable transmission portion 20. In this respect, the CB-transmitted torque Tcb of the initiative coupling device CB which is controlled to progressively implement the shifting action is used as the AT-transmitted torque Tat in the mathematical equation (1). The CB-transmitted torque Tcb used as the AT-transmitted torque Tat in the mathematical equation (1) is a feed-forward value. Therefore, the electronic control device 80 sets the CB-transmitted torque Tcb of the initiative coupling device CB. When the electronic control device 80 sets the CB-transmitted torque Tcb of the initiative coupling device CB, the value of the CB-transmitted torque Tcb of the initiative coupling device CB is set according to the AT input torque Ti based on the required engine power Pedem achieving the required vehicle drive power Pdem, and according to an appropriate one of a plurality of predetermined relationships between the CB-transmitted torque Tcb and the required input torque, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions.

Figure 8:
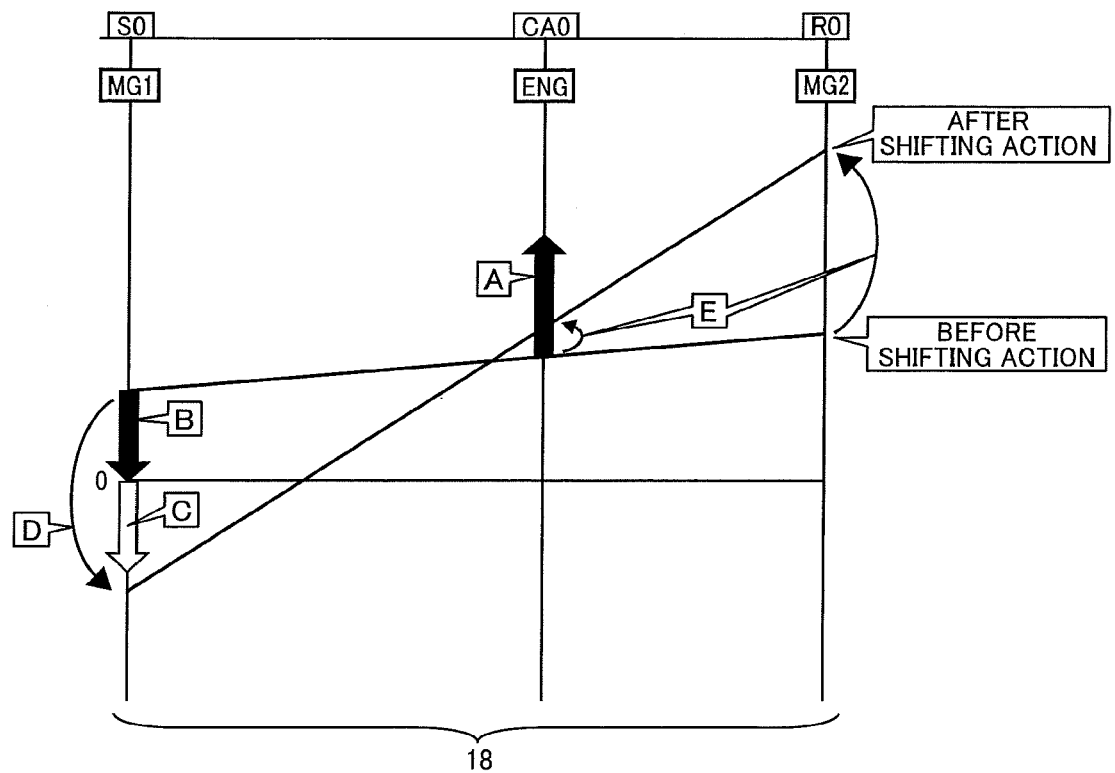
FIG. 8 is an example of a collinear chart for explaining a normal power-on shift-down control of the step-variable transmission portion and corresponds to a part of the continuously variable transmission portion in the collinear chart of FIG. 3.

FIG. 8 is a diagram of an example of a collinear chart for explaining a normal power-on shift-down control of the step-variable transmission portion 20. FIG. 8 corresponds to a part of the continuously variable transmission portion 18 in the collinear chart of FIG. 3. In FIG. 8, during a power-on shift-down action of the step-variable transmission portion 20, for example, the control (feedback control) using the mathematical equation (1) described above is provided to cause the first motor/generator MG1 to output a shift-progressing torque (also referred to as a shift-progressing torque Tgsh) necessary for the progress of the power-on shift-down action (see a white arrow in a portion C) while generating a reaction torque (also referred to as a reaction torque Tgrf) (see a black arrow in a portion B) receiving the engine torque Te (see a black arrow in a portion A), so that the operating speed of the first motor/generator MG1 (the MG1 speed cog) is lowered (see an arrow in a portion D). As a result, the control is provided such that the MG2 angular acceleration value dωm/dt and the engine angular acceleration value dωe/dt coincide with the target values (i.e., the AT input speed ωi (=MG2 speed ωm) and the engine speed ωe are controlled to be aimed speeds) (see an arrow in a portion E).

In the first motor/generator MG1, as shown in FIG. 7, the MG1 torque Tg may be limited. If the MG1 torque Tg is limited during the power-on shift-down action of the step-variable transmission portion 20, the first motor/generator MG1 cannot sufficiently generate the shift-progressing torque Tgsh in addition to the reaction torque Tgrf in some cases.

Figure 11:
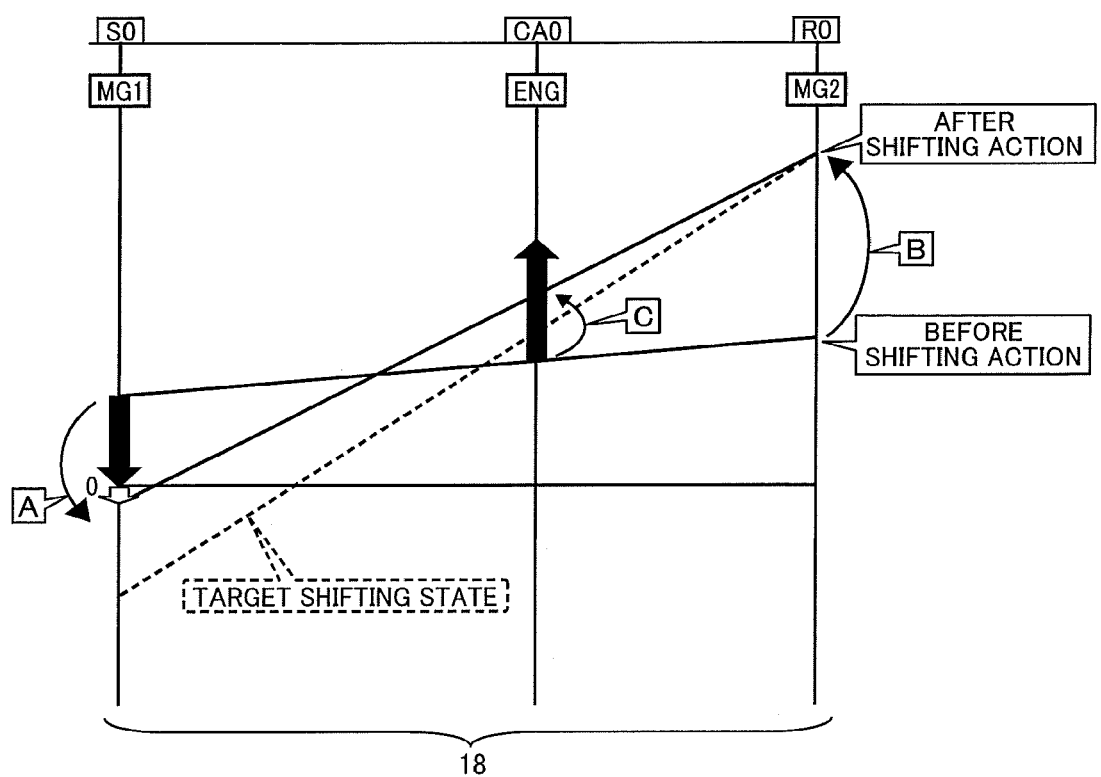
FIG. 11 is an example of a collinear chart for explaining the power-on shift-down control (a comparative example) of the step-variable transmission portion when the MG1 torque is limited.

FIG. 11 is an example of a collinear chart for explaining the power-on shift-down control (a comparative example different from this example) of the step-variable transmission portion 20 when the MG1 torque Tg is limited. FIG. 11 corresponds to the collinear chart of FIG. 8. In FIG. 11, during the power-on shift-down action of the step-variable transmission portion 20, similar to the normal power-on shift-down control shown in FIG. 8, the first motor/generator MG1 outputs the shift-progressing torque Tgsh while generating the reaction torque Tgrf. In this state, while the MG1 torque Tg is limited, the first motor/generator MG1 cannot sufficiently generate the shift-progressing torque Tgsh and cannot lower the operating speed thereof (the MG1 speed ωg) into a target shifting state (see a dashed line) in some cases (see an arrow in a portion A). In such a case, the progress of the shift-down action may stagnate, or the engine speed ωe may be affected by an increase in the AT input speed ωi (=MG2 speed ωm) due to the shift-down action (see an arrow in a portion B) and may race up (temporarily increase) higher than a post-downshifting synchronizing speed ωesyca as a target speed (=ωox post-shifting speed ratio γta of the transmission device 40) (see an arrow in a portion C), possibly giving the driver a strange feeling.

Therefore, if the MG1 torque Tg is in the limited state during the power-on shift-down action of the step-variable transmission portion 20, the electronic control device 80 preliminarily limits the required engine power Pedem (in this case, the required engine torque Tedem has the same meaning). As a result, even when the MG1 torque Tg is limited during the power-on shift-down action of the step-variable transmission portion 20, the first motor/generator MG1 can generate the shift-progressing torque Tgsh as much as necessary, in addition to the reaction torque Tgrf.

Specifically, the electronic control device 80 further includes a vehicle state determining means, i.e., a vehicle state determining portion 86, a limited state determining means, i.e., a limited state determining portion 88, and an output limiting means, i.e., an output limiting portion 90, so as to implement the control function of preliminarily limiting the required engine power Pedem described above.

The vehicle state determining portion 86 determines whether the power-on shift-down action of the step-variable transmission portion 20 is in progress when the vehicle 10 is running, for example, based on the hydraulic control command signal Sat. The vehicle state determining portion 86 determines whether the inertia phase has started during the power-on shift-down action of the step-variable transmission portion 20, for example, based on whether the AT input speed ωi has started increasing toward the post-downshifting synchronizing speed ωisyca. The vehicle state determining portion 86 determines whether the power-on shift-down action of the step-variable transmission portion 20 is completed, for example, based on the hydraulic control command signal Sat.

If the vehicle state determining portion 86 determines that the power-on shift-down action of the step-variable transmission portion 20 is in progress, the limited state determining portion 88 determines whether the MG1 torque Tg is in a limited state of being limited lower than a predetermined load Loadf capable of ensuring the shift-progressing torque Tgsh necessary for the progress of the power-on shift-down action of the step-variable transmission portion 20. The predetermined load Loadf is a lower limit value of the MG1 torque limitation rate Rres enabling the first motor/generator MG1 to output the reaction torque Tgrf and the shift-progressing torque Tgsh, for example. Therefore, the predetermined load Loadf is the MG1 torque limitation rate Rres necessary for the first motor/generator MG1 to output the reaction torque Tgrf and the shift-progressing torque Tgsh. The limited state determining portion 88 calculates an actual MG1 torque limitation rate Rres (also referred to as the actual MG1 torque limitation rate Rres) based on the MG1 temperature THg by using a predefined relationship (map) between the MG1 temperature THg and the MG1 torque limitation rate Rres as shown in FIG. 7. The limited state determining portion 88 determines whether the MG1 torque Tg is in the limited state, based on whether the actual MG1 torque limitation rate Rres is smaller than the predetermined load Loadf.

A change amount Δωi of the AT input speed ωi before and after the power-on shift-down action (=post-downshifting synchronizing speed ωisyca—pre-downshifting synchronizing speed ωisycb (=ωo× pre-shifting speed ratio ratio γatb)) differs depending on a kind of shifting actions different in terms of the AT gear positions between which the power-on shift-down action is performed in the step-variable transmission portion 20. It is considered that when the change amount Δωi of the AT input speed ωi is larger, a larger reduction amount of the MG1 speed ωg is necessary during the power-on shift-down action so that a larger shift-progressing torque Tgsh is required. When the output speed coo (the vehicle running speed V has the same meaning) is higher, the change amount Δωi of the AT input speed ωi is made larger. Alternatively, it is considered that when a change amount Δωe of the engine speed ωe before and after the power-on shift-down action of the step-variable transmission portion 20 (=post-downshifting synchronizing speed ωesyca—pre-downshifting synchronizing speed ωesycb (=ωo× pre-shifting speed ratio γtb of the transmission device 40)) is smaller, a larger reduction amount of the MG1 speed ωg is necessary during the power-on shift-down action so that the larger shift-progressing torque Tgsh is required. When the shift-progressing torque Tgsh is larger, the predetermined load Loadf is made larger. Therefore, the limited state determining portion 88 sets the predetermined load Loadf based on at least one parameter out of the kind of the shifting action of the step-variable transmission portion 20, the output speed ωo (or the vehicle running speed V), and the change amount Δωe of the engine speed ωe during the power-on shift-down action of the step-variable transmission portion 20.

More preferably, the limited state determining portion 88 has (i.e., stores) a relationship (shift-progressing torque map) in which the shift-progressing torque Tgsh is defined in advance by using as a parameter at least one of the kind of the shifting action of the step-variable transmission portion 20, the output speed coo (or the vehicle running speed V), and the change amount Δωe of the engine speed ωe during the power-on shift-down action of the step-variable transmission portion 20. The limited state determining portion 88 calculates the shift-progressing torque Tgsh based on the at least one parameter by using the shift-progressing torque map and sets the predetermined load loadf based on the reaction torque Tgrf receiving the current engine torque Te and the calculated shift-progressing torque Tgsh.

The limitation of the required engine power Pedem is preferably placed preliminarily (in advance) before, rather than after, the stagnation of progress of the shift-down action or the occurrence of racing of the engine speed ωe. Therefore, the limited state determining portion 88 determines whether the MG1 torque Tg is in the limited state, before start of change in the AT input speed ωi due to the power-on shift-down action of the step-variable transmission portion 20 (i.e., before the start of the inertia phase). Preferably, the limited state determining portion 88 determines whether the MG1 torque Tg is in the limited state from initiation of the power-on shift-down action of the step-variable transmission portion 20.

If the limited state determining portion 88 determines that the MG1 torque Tg is not in the limited state during the power-on shift-down action of the step-variable transmission portion 20, the hybrid control portion 84 provides a normal-time control in which the shifting-time basic control is provided without limitation of the required engine power Pedem.

If the limited state determining portion 88 determines that the MG1 torque Tg is in the limited state during the power-on shift-down action of the step-variable transmission portion 20, the output limiting portion 90 outputs to the hybrid control portion 84 a command to limit the engine power Pe to a predetermined power Pef or less (i.e., to limit the engine torque Te to a predetermined torque Tef or less). During the power-on shift-down action of the step-variable transmission portion 20, the hybrid control portion 84 provides the shifting-time basic control with the required engine power Pedem limited, based on the command from the output limiting portion 90.

The predetermined power Pef is the upper limit engine power Pe enabling the MG1 torque Tg to achieve the torque acquired by adding the shift-progressing torque Tgsh to the reaction torque Tgrf receiving the engine torque Te and is a limit value (upper limit value) of the required engine power Pedem for making it possible to achieve the shift-progressing torque Tgsh necessary during the power-on shift-down action of the step-variable transmission portion 20. The predetermined torque Tef is the upper limit engine torque Te enabling the MG1 torque Tg to achieve the torque acquired by adding the shift-progressing torque Tgsh to the reaction torque Tgrf receiving the engine torque Te and is an upper limit value of the required engine torque Tedem for making it possible to achieve the shift-progressing torque Tgsh necessary during the power-on shift-down action of the step-variable transmission portion 20.

As described above, at least one parameter out of the kind of the shifting action of the step-variable transmission portion 20, the output speed ωo (or the vehicle running speed V), and the change amount Δωe of the engine speed ωe during the power-on shift-down action of the step-variable transmission portion 20 relates to the necessary value of the shift-progressing torque Tgsh. When the actual MG1 torque limitation rate Rres defined as the limit value of the MG1 torque Tg is smaller, a smaller torque is output as the reaction torque Tgrf, which is acquired by subtracting the necessary shift-progressing torque Tgsh from the MG1 torque Tg that can be output, making the engine torque Te that can be received by the reaction torque Tgrf smaller. Therefore, the output limiting portion 90 sets the predetermined power Pef (i.e., sets the predetermined torque Tef) based on at least one parameter out of the actual MG1 torque limitation rate Rres, the kind of the shifting action of the step-variable transmission portion 20, the output speed ωo (or the vehicle running speed V), and the change amount Δωe of the engine speed ωe during the power-on shift-down action of the step-variable transmission portion 20. The predetermined power Pef (predetermined torque Tef) may be set based on the at least one parameter, for example, at the initiation of the power-on shift-down action of the step-variable transmission portion 20 (or at a moment of determination when the limited state determining portion 88 determines that the MG1 torque Tg is in the limited state), and may be used as a uniform value over the power-on shift-down action. Alternatively, the predetermined power Pef (predetermined torque Tef) may be set based on the at least one parameter during the power-on shift-down action of the step-variable transmission portion 20 and may be variable during the power-on shift-down action.

More preferably, the output limiting portion 90 has (i.e., stores) a relationship (limit value map) in which the upper limit value is defined in advance for the engine power Pe (the engine torque Te in the case of setting the predetermined torque Tef) for achieving the shift-progressing torque Tgsh necessary during the power-on shift-down action of the step-variable transmission portion 20, by using as a parameter at least one of the actual MG1 torque limitation rate Rres, the kind of the shifting action of the step-variable transmission portion 20, the output speed ωo (or the vehicle running speed V), and the change amount Δωe of the engine speed ωe during the power-on shift-down action of the step-variable transmission portion 20. The output limiting portion 90 sets the predetermined power Pef (i.e., sets the predetermined torque Tef) based on the at least one parameter by using the limit value map.

The limitation of the required engine power Pedem may be placed from the moment of determination when the limited state determining portion 88 determines that the MG1 torque Tg is in the limited state, or may be placed at least in a shifting transition period after the start of the inertia phase, for example. In particular, the output limiting portion 90 initiates the limitation of the engine power Pe (i.e., the limitation of the engine torque Te), for example, at the start of change in the AT input speed ωi due to the power-on shift-down action of the step-variable transmission portion 20 (i.e., initiates the limitation if the vehicle state determining portion 86 determines that the inertia phase has started during the power-on shift-down action of the step-variable transmission portion 20).

It is desirable to avoid an unstable operation (combustion) of the engine 14 due to the limitation of the engine power Pe. Therefore, the output limiting portion 90 initiates the limitation of the engine power Pe (i.e., the limitation of the engine torque Te) while the engine power Pe (engine torque Te) is stably output. For example, the output limiting portion 90 places the limitation of the engine power Pe when the combustion of the engine 14 is stable.

The limitation of the required engine power Pedem is preferably continued until a moment of termination of the inertia phase (i.e., until a moment of completion of the power-on shift-down action when the AT input speed ωi is synchronized with the post-downshifting synchronizing speed ωisyca). Therefore, the output limiting portion 90 terminates the limitation of the engine power Pe (i.e., the limitation of the engine torque Te) if the vehicle state determining portion 86 determines that the power-on shift-down action of the step-variable transmission portion 20 is completed. Alternatively, the limitation of the required engine power Pedem may be continued until the possibility of stagnation of progress of the shift-down action or the possibility of occurrence of racing of the engine speed ωe becomes lower. Therefore, the output limiting portion 90 terminates the limitation of the engine power Pe (i.e., the limitation of the engine torque Te), for example, when the power-on shift-down action of the step-variable transmission portion 20 is completed, or when a progress degree Rpro of the power-on shift-down action has reached a predetermined progress degree Rprof, or when a predetermined length of time TMdsf has elapsed from the start of the control of the power-on shift-down action, or when a predetermined length of time TMinaf has elapsed from the start of change in the AT input speed ωi due to the power-on shift-down action (i.e., the start of the inertia phase). The progress degree Rpro of the power-on shift-down action is a degree indicating how much the power-on shift-down action has progressed and, for example, the progress degree Rpro is implemented by using a differential rotating speed Dωi (=ωisyca−ωi) between the actual AT input speed ωi and the post-downshifting synchronizing speed ωisyca, a proportion Rωi (=ωi/ωisyca) of the actual AT input speed ωi to the synchronizing speed ωisyca, etc. The predetermined progress degree Rprof, the predetermined length of time TMdsf, and the predetermined length of time TMinaf are respective threshold values defined in advance so as to determine that the possibility of stagnation of progress of the shift-down action or the possibility of occurrence of racing of the engine speed ωe is low or does not exist even when the limitation of the required engine power Pedem is canceled.

If switching to a power-off state (a state where the accelerator pedal is not depressed) is made during the power-on shift-down action of the step-variable transmission portion 20, the initiative coupling device CB may be switched from the released state to the engaged state, so that the torque control of the MG1 torque Tg and the MG2 torque Tm, the hydraulic control of the initiative coupling device CB, etc. may be switched from the control suitable for a power-on shift-down action to the control suitable for a power-off shift-down action. In such a case, if the limitation of the required engine power Pedem is being placed during the power-on shift-down action, it is desirable to cancel the limitation. Alternatively, since the required engine power Pedem is reduced by switching to the power-off state, it is not necessary to limit the required engine power Pedem. Therefore, if a shift-down action is allowed to progress as a power-off shift-down action due to switching to the power-off state during the limitation of the engine power Pe (i.e., during the limitation of the engine torque Te), the output limiting portion 90 cancels the limitation of the engine power Pe (i.e., cancels the limitation of the engine torque Te).

Figure 9:
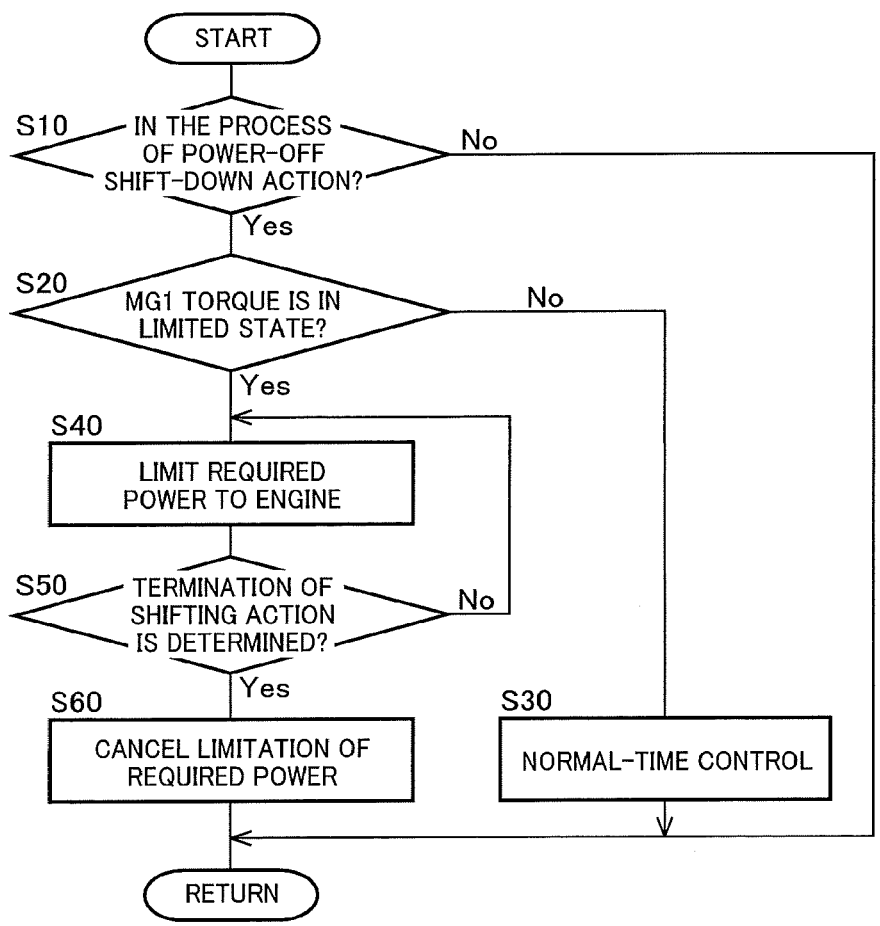
FIG. 9 is a flowchart for explaining a main portion of the control operation of an electronic control device, i.e., the control operation for preventing or suppressing a strange feeling given to a driver due to stagnation of progress of a shifting action of the step-variable transmission or racing of an operating speed of an engine at the time of the power-on shift-down action of the step-variable transmission portion.
Figure 10:
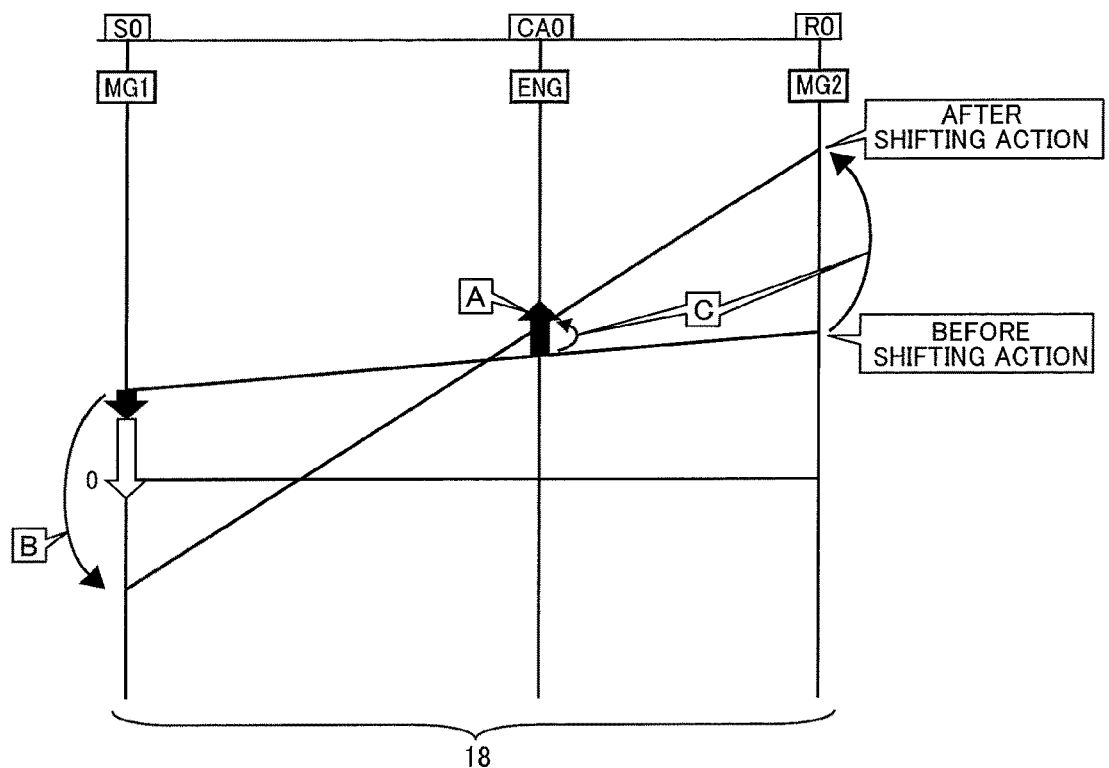
FIG. 10 is an example of a collinear chart for explaining the power-on shift-down control of the step-variable transmission portion when the control operation shown in the flowchart of FIG. 9 is performed.

FIG. 9 is a flowchart for explaining a main portion of the control operation of the electronic control device 80, i.e., the control operation for preventing or suppressing a strange feeling given to a driver due to stagnation of progress of a shifting action or racing of the engine speed ωe at the time of the power-on shift-down action of the step-variable transmission portion 20, and the control operation is repeatedly executed during running of the vehicle 10, for example. FIG. 10 is a diagram of an example of a collinear chart for explaining the power-on shift-down control of the step-variable transmission portion 20 when the control operation shown in the flowchart of FIG. 9 is performed. FIG. 10 corresponds to the collinear chart of FIG. 8.

In FIG. 9, first, at step (hereinafter, step is omitted) S10 corresponding to the function of the vehicle state determining portion 86, it is determined whether the power-on shift-down action of the step-variable transmission portion 20 is in progress. If the determination of S10 is negative, this routine is terminated. If the determination of S10 is affirmative, it is determined at S20 corresponding to the function of the limited state determining portion 88 whether the MG1 torque Tg is in a limited state of being limited lower than the predetermined load Loadf capable of ensuring the shift-progressing torque Tgsh necessary for the progress of the power-on shift-down action of the step-variable transmission portion 20. If the determination of S20 is negative, at S30 corresponding to the function of the hybrid control portion 84, the normal control during the power-on shift-down action of the step-variable transmission portion 20 is provided (i.e., the normal-time control in which the shifting-time basic control is provided without limitation of the required engine power Pedem) (see FIG. 8). If the determination of S20 is affirmative, at S40 corresponding to the functions of the output limiting portion 90 and the hybrid control portion 84, the engine power Pe is limited to the predetermined power Pef or less, and the shifting-time basic control is provided with the required engine power Pedem limited. Subsequently, at S50 corresponding to the function of the vehicle state determining portion 86, it is determined whether the power-on shift-down action of the step-variable transmission portion 20 is completed (terminated). If the determination of S50 is negative, S40 is executed. If the determination of S50 is affirmative, the limitation of the required engine power Pedem is terminated (canceled) at S60 corresponding to the functions of the output limiting portion 90 and the hybrid control portion 84.

In FIG. 10, during the power-on shift-down action of the step-variable transmission portion 20, similar to the normal power-on shift-down control shown in FIG. 8, the first motor/generator MG1 outputs the shift-progressing torque Tgsh while generating the reaction torque Tgrf. In this case, if the MG1 torque Tg is in the limited state, the required engine power Pedem (required engine torque Tedem) is reduced in advance (see a black arrow in a portion A) so as to achieve the engine torque Te enabling the first motor/generator MG1 to ensure the reaction torque Tgrf while outputting the shift-progressing torque Tgsh necessary for the progress of the shifting action. As a result, the shifting action is allowed to progress while the MG1 speed ωg is appropriately lowered by the shift-progressing torque Tgsh (see an arrow in a portion B), the MG2 speed ωm and the engine speed ωe are controlled to the aimed speeds (see an arrow in a portion C).

As described above, according to this example, when the MG1 torque Tg is in the limited state during the power-on shift-down action of the step-variable transmission portion 20, the engine power Pe is limited to the predetermined power Pef or less (i.e., the engine torque Te is limited to the predetermined torque Tef or less), and the reaction torque Tgrf of the first motor/generator MG1 receiving the engine torque Te is reduced. This enables the first motor/generator MG1 to ensure the torque for lowering the operating speed thereof (the MG1 speed ωg) for performing the shifting action (i.e., the shift-progressing torque Tgsh necessary for the progress of the power-on shift-down action), so that the power-on shift-down can be performed while preventing or suppressing the stagnation of progress of the shifting action or the racing of the engine speed ωe. Therefore, at the time of the power-on shift-down action of the step-variable transmission portion 20, a driver can be prevented or restrained from having a strange feeling due to stagnation of progress of the shifting action or the racing of the engine speed ωe.

According to this example, since the predetermined load Loadf is set based on at least one parameter out of the kind of the shifting action of the step-variable transmission portion 20, the output speed ω (or the vehicle running speed V), and the change amount Δωe of the engine speed ωe during the power-on shift-down action of the step-variable transmission portion 20, it is appropriately determined whether the MG1 torque Tg is in the limited state.

According to this example, since the predetermined power Pef is set (i.e., the predetermined torque Tef is set) based on at least one parameter out of the actual MG1 torque limitation rate Rres, the kind of the shifting action of the step-variable transmission portion 20, the output speed ω (or the vehicle running speed V), and the change amount Δωe of the engine speed ωe during the power-on shift-down action of the step-variable transmission portion 20, the power-on shift-down action can appropriately be performed while preventing or suppressing the stagnation of progress of the shifting action or the racing of the engine speed ωe.

According to this example, the limitation of the engine power Pe (i.e., the limitation of the engine torque Te) is initiated while the engine power Pe (the engine torque Te) is stably output, so that the operation of the engine 14 hardly becomes unstable even if the engine power Pe (the engine torque Te) is limited.

According to this example, the limitation of the engine power Pe (i.e., the limitation of the engine torque Te) is terminated when the power-on shift-down action of the step-variable transmission portion 20 is completed, or when the progress degree Rpro of the power-on shift-down action has reached the predetermined progress degree Rprof, or when the predetermined length of time TMdsf has elapsed from the start of the control of the power-on shift-down action, or when the predetermined length of time TMinaf has elapsed from the start of change in the AT input speed ωi due to the power-on shift-down action (i.e., the start of the inertia phase), so that the engine power Pe (the engine torque Te) is appropriately limited while the possibility of stagnation of progress of the shifting action or racing of the engine speed ωe exists. From another viewpoint, if the possibility of stagnation of progress of the shifting action or racing of the engine speed ωe becomes lower, the engine power Pe (the engine torque Te) is more easily output as requested.

According to this example, if a shift-down action is allowed to progress as a power-off shift-down action due to switching to the power-off state during the limitation of the engine power Pe (i.e., during the limitation of the engine torque Te), the limitation of the engine power Pe is canceled (i.e., the limitation of the engine torque Te is canceled), so that the control suitable for the power-off shift-down action is properly provided.

While the preferred embodiment of this invention has been described in detail by reference to the drawings, it is to be understood that the invention may be otherwise embodied.

For example, although the limit values of the predetermined load Loadf and the MG1 torque Tg are defined by the MG1 torque limitation rate Rres in the example described above, the present invention is not limited to this form. For example, the limit values of the predetermined load Loadf and the MG1 torque Tg may be defined by the MG1 torque Tg. In such a case, the predetermined load Loadf is the lower limit value of the MG1 torque Tg enabling the first motor/generator MG1 to output the reaction torque Tgrf and the shift-progressing torque Tgsh (i.e., the MG1 torque Tg necessary for the first motor/generator MG1 to output the reaction torque Tgrf and the shift-progressing torque Tgsh). The limit value of the MG1 torque Tg is the upper limit value of the MG1 torque Tg allowed to be output in the first motor/generator MG1.

The manner of shifting-time basic control of the transmission device 40 (for example, the shifting control according to the mathematical equation (1)) in the illustrated first embodiments is applicable to the shifting control of the step-variable transmission portion 20 while the transmission device 40 as a whole is operated as a continuously variable transmission, as well as the step-variable shifting control to shift the transmission device 40 to a selected one of the overall speed positions together with a shifting action of the step-variable transmission portion 20.

In the illustrated embodiments, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 performs a shifting action by selective engagement of a plurality of coupling devices. That is, the step-variable transmission portion 20 which is the planetary gear type automatic transmission in the embodiments may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices each connecting to respective inputs of the two shifting units correspond to the selected ones of plurality of coupling devices of the present invention.

In the illustrated embodiments, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated embodiments, the ten overall speed positions are established for the four AT gear positions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed ωe is held with a predetermined range.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first motor/generator MG1 and the intermediate power transmitting member 30.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle (Hybrid vehicle)
14: Engine
20: Step-variable transmission portion (Automatic transmission)
28: Drive wheels
30: Intermediate power transmitting member (Input rotary member of automatic transmission)
32: Differential mechanism
CA0: Carrier (First rotary element)
S0: Sun gear (Second rotary element)
R0: Ring gear (Third rotary element)
80: Electronic control device (Control apparatus)
84: Hybrid control portion
88: Limited state determining portion
90: Output limiting portion
CB: Coupling devices
MG1: First motor/generator
MG2: Second motor/generator

What is claimed is:

1. A control apparatus for a hybrid vehicle provided with an engine, a differential mechanism having a first rotary element to which the engine is operatively connected, a second rotary element to which a first motor/generator is operatively connected, and a third rotary element to which an intermediate power transmitting member is connected, a second motor/generator operatively connected to the intermediate power transmitting member, and an automatic transmission which constitutes a part of a power transmitting path between the intermediate power transmitting member and drive wheels and in which a shifting action is performed by selective engagement of a plurality of coupling devices, the control apparatus comprising:

a hybrid control portion configured to control an output torque of the first motor/generator and an output torque of the second motor/generator during the shifting action of the automatic transmission on the basis of an output torque of the engine and a transmitted torque of the coupling devices, such that an angular acceleration value of the second motor/generator and an angular acceleration value of the engine coincide with respective target values;

a limited state determining portion configured to determine whether the output torque of the first motor/generator is in a limited state of being limited lower than a predetermined load ensuring a shift-progressing torque necessary for progress of a power-on shift-down action of the automatic transmission; and an output limiting portion configured to limit the output torque of the engine to a predetermined torque or less if the output torque of the first motor/generator is in the limited state during the power-on shift-down action of the automatic transmission.

2. The control apparatus according to claim 1, wherein the limited state determining portion sets the predetermined load based on at least one of a kind of a shifting action of the automatic transmission, a vehicle running speed, and a change amount of an operating speed of the engine during the power-on shift-down action of the automatic transmission.

3. The control apparatus according to claim 2, wherein
the predetermined torque is an upper limit output torque of the engine enabling the output torque of the first motor/generator to achieve a torque acquired by adding the shift-progressing torque to a reaction torque receiving the output torque of the engine, and wherein
the output limiting portion sets the predetermined torque based on at least one of a limit value of the output torque of the first motor/generator, the kind of the shifting action of the automatic transmission, the vehicle running speed, and the change amount of the operating speed of the engine during the power-on shift-down action of the automatic transmission.

4. The control apparatus according to claim 3, wherein the output limiting portion initiates limitation of the output torque of the engine when the output torque of the engine is stably output.

5. The control apparatus according to claim 4, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

6. The control apparatus according to claim 3, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

7. The control apparatus according to claim 2, wherein the output limiting portion initiates limitation of the output torque of the engine when the output torque of the engine is stably output.

8. The control apparatus according to claim 7, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

9. The control apparatus according to claim 2, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

10. The control apparatus according to claim 1, wherein
the predetermined torque is an upper limit output torque of the engine enabling the output torque of the first motor/generator to achieve a torque acquired by adding the shift-progressing torque to a reaction torque receiving the output torque of the engine, and wherein
the output limiting portion sets the predetermined torque based on at least one of a limit value of the output torque of the first motor/generator, a kind of a shifting action of the automatic transmission, a vehicle running speed, and a change amount of an operating speed of the engine during the power-on shift-down action of the automatic transmission.

11. The control apparatus according to claim 10, wherein the output limiting portion initiates limitation of the output torque of the engine when the output torque of the engine is stably output.

12. The control apparatus according to claim 11, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

13. The control apparatus according to claim 10, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

14. The control apparatus according to claim 1, wherein the output limiting portion initiates limitation of the output torque of the engine when the output torque of the engine is stably output.

15. The control apparatus according to claim 14, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

16. The control apparatus according to claim 1, wherein the output limiting portion terminates limitation of the output torque of the engine when the power-on shift-down action of the automatic transmission is completed, or when a progress degree of the power-on shift-down action has reached a predetermined progress degree, or when a predetermined length of time has elapsed from start of control of the power-on shift-down action, or when a predetermined length of time has elapsed from start of change in a rotating speed of an input rotary member of the automatic transmission due to the power-on shift-down action.

17. The control apparatus according to claim 1, wherein if a shift-down action is allowed to progress as a power-off shift-down action due to switching to a power-off state during limitation of the output torque of the engine, the output limiting portion cancels the limitation of the output torque of the engine.

* * * * *